(12) United States Patent
Vicq et al.

(10) Patent No.: US 11,699,307 B2
(45) Date of Patent: Jul. 11, 2023

(54) ARCHITECTURE FOR MONITORING AT LEAST ONE AIRCRAFT AND ASSOCIATED MONITORING METHOD

(71) Applicant: AIRBUS HELICOPTERS, Marignane (FR)

(72) Inventors: Alexandre Vicq, Marseilles (FR); Frederic Perez, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 101 days.

(21) Appl. No.: 17/504,079

(22) Filed: Oct. 18, 2021

(65) Prior Publication Data

US 2022/0137645 A1  May 5, 2022

(30) Foreign Application Priority Data

Nov. 4, 2020  (FR) ...................................... 2011324

(51) Int. Cl.
| | | |
|---|---|---|
| *G07C 5/00* | (2006.01) | |
| *G08G 5/00* | (2006.01) | |
| *G05B 23/02* | (2006.01) | |
| *G07C 5/08* | (2006.01) | |
| *G06F 17/40* | (2006.01) | |
| *G05D 1/10* | (2006.01) | |

(52) U.S. Cl.
CPC ......... *G07C 5/008* (2013.01); *G05B 23/0283* (2013.01); *G06F 17/40* (2013.01); *G07C 5/006* (2013.01); *G07C 5/0808* (2013.01); *G07C 5/0816* (2013.01); *G07C 5/0841* (2013.01); *G08G 5/0004* (2013.01); *G08G 5/0021* (2013.01); *G05D 1/102* (2013.01); *G05D 1/104* (2013.01)

(58) Field of Classification Search
None
See application file for complete search history.

(56) References Cited

U.S. PATENT DOCUMENTS 11,334,340 B2 * 5/2022 De Meulder ........... H04L 63/04
2011/0106366 A1   5/2011 Ric et al.
(Continued)

FOREIGN PATENT DOCUMENTS

| EP | 0927933 A2 | 7/1999 |
|---|---|---|
| EP | 2991044 A1 | 3/2016 |
| FR | 3064088 A1 | 9/2018 |

OTHER PUBLICATIONS

French Search Report for French Application No. FR2011324, Completed by the French Patent Office, dated Jun. 30, 2021, 8 pages.

*Primary Examiner* — Peter D Nolan
*Assistant Examiner* — Michael F Whalen
(74) *Attorney, Agent, or Firm* — Brooks Kushman P.C.

(57) ABSTRACT

An architecture for monitoring at least one aircraft. The architecture comprises an avionics system configured to generate avionics data during use of the aircraft; a mobile electronic device including an analysis unit configured to convert at least one maintenance operation into operational data; and an alerter configured to display at least one item of monitoring information; and a cloud computing infrastructure. The analysis unit and the alerter are configured to implement a local operating mode and an operating mode connected to the cloud computing infrastructure.

12 Claims, 2 Drawing Sheets

(56) References Cited

U.S. PATENT DOCUMENTS

| | | |
|---|---|---|
| 2015/0187146 A1 | 7/2015 | Chen et al. |
| 2016/0016671 A1 | 1/2016 | Fournier et al. |
| 2016/0055685 A1* | 2/2016 | Lilly .................... G07C 5/0808 701/1 |
| 2018/0268717 A1 | 9/2018 | Vicq et al. |

* cited by examiner

ARCHITECTURE FOR MONITORING AT LEAST ONE AIRCRAFT AND ASSOCIATED MONITORING METHOD

CROSS REFERENCE TO RELATED APPLICATIONS

This application claims priority to French patent application No. FR 20 11324 filed on Nov. 4, 2020, the disclosure of which is incorporated in its entirety by reference herein.

FIELD OF THE DISCLOSURE

The present disclosure relates to the technical field of architectures for information or assistance systems making it possible to monitor, plan and facilitate the maintenance of an aircraft, or indeed a fleet of aircraft. Such aircraft may consist, for example, of airplanes, rotorcraft and possibly helicopters.

BACKGROUND

Generally, and as described by document FR 3 064 088, monitoring architectures may comprise one or more aircraft and a mobile electronic device that is able to move relative to an aircraft.

A mobile electronic device is able to collect avionics data generated by different sensors during the use of an aircraft. Furthermore, such a mobile electronic device is, for example, formed by a tablet computer, a smartphone or even a laptop computer, or indeed a removable central unit of a computer powered by the aircraft.

Such avionics data are, for example, generated during a flight phase of the aircraft from sensors measuring the variations of a state parameter such as the voltage or the intensity of an electrical signal passing through these sensors. Such sensors can therefore make it possible to take measurements of a physical parameter such as, for example, variations in the position or altitude of the aircraft, the pressure or temperature of a fluid circulating in the aircraft, the vibrations to which a component of the aircraft is subjected, the quantity of fuel present in the tank or tanks, etc.

This avionics data is then transmitted to a ground station and/or a cloud computing infrastructure.

Once transmitted to the cloud computing infrastructure, such avionics data can then be decoded, processed and then standardized or valorized in order to be transmitted again to the mobile electronic device and then used by an operator responsible for the monitoring or maintenance of an aircraft.

Document EP 0 927 933 describes monitoring architectures that can be adapted to a device in the testing phase.

However, these monitoring architectures require the mobile electronic devices to be constantly connected to the cloud computing infrastructure in order to be able to be used.

Document EP 2 991 044 A1 relates to a system and a method for monitoring vehicle systems using mobile devices, such as a telephone, a tablet, a computer, etc.

In addition, such a method allows information relating to the state of health of one or more mechanical elements of a rotorcraft to be presented.

Also, a client device 120, such as a mobile phone, for example, is connected via a "point-to-point" wireless connection to a monitoring system 104 arranged on board the rotorcraft. The monitoring system 104 receives the raw data from at least one sensor 106 and can generate health information from the raw data.

This document EP 2 991 044 A1 also describes the use of a server 130 that can be connected to the client device 120, possibly via a network 116. The client device 120 then acts as a communication link with the monitoring system 104 installed on the rotorcraft and can transmit both the health information and the raw data to it.

In addition, the server 130 may include one or more server computers or one or more other devices coupled to the network 116.

For example, the server 130 may be formed by dedicated or shared hardware servers and may also use virtual server functionalities in the context of a cloud computing service.

However, document EP 2 991 044 A1 does not describe that the client device 120 comprises an analysis unit configured to implement local and connected operating modes in accordance with the disclosure.

Indeed, the health information is generated by the monitoring system 104 on board the aircraft. No analysis is thus performed by the client device 120 to generate health information.

Document US 2011/106366 A1 describes a mobile maintenance terminal that can be used in operation or when an aircraft is at its base. In addition, when the aircraft is in operation, the operator can only access the avionics data in order to perform a maintenance diagnosis.

Furthermore, data may be transmitted directly from an aircraft 100 to an airline's maintenance information system 115, e.g., via an IP link. This data can be processed by the maintenance information systems in order to monitor the state of the fleet of aircraft. Furthermore, this data makes it possible to build up the experience acquired during the operation of the aircraft and thus optimize maintenance operations.

Document US 2015/187146 A1 relates to a remote vehicle diagnostic system that uses a smartphone as a means of centralized communication between a vehicle and several remote resources.

The system includes an application that can be downloaded to the smartphone in order to program the phone to execute the desired functionality. The smartphone application can enable the smartphone to operate in several different modes, including a diagnostic mode and an emergency mode.

In diagnostic mode, the smartphone can relay vehicle data to a remote diagnostic center.

The smartphone can also query the user to obtain symptomatic diagnostic information, which can also be downloaded to the remote diagnostic center.

In emergency mode, the smartphone can be configured to download critical information to a remote diagnostic center, as well as an emergency response center. The emergency mode can be triggered automatically in response to a vehicle accident or, alternatively, by actuation by the user.

Document US 2016/016671 A1 relates to the field of avionics and, in particular, that of processing the alarm and maintenance messages of an aircraft. It describes a method implemented by computer for managing alarm and maintenance messages of an aircraft and another monitoring architecture far removed from the disclosure.

SUMMARY

An object of the present disclosure is therefore to propose an alternative architecture for monitoring and assisting maintenance that is innovative. In addition, such an infrastructure allows an administrative certification process that is simpler to implement and therefore helps limit the costs of manufacturing and certifying this infrastructure, in particular during subsequent modifications or updates.

The disclosure therefore relates to an architecture for monitoring at least one aircraft, the architecture including:

said at least one aircraft equipped with an avionics system configured to generate avionics data during use of an aircraft, the avionics system comprising a storage unit configured to store the avionics data;

a mobile electronic device including:
a first communication interface configured to receive primary data including at least the avionics data; and
a second communication interface configured to emit the primary data; and a cloud computing infrastructure including:
a third communication interface configured to receive the primary data emitted by the second interface;
at least one external memory storing a history of the primary data of the at least one aircraft, each of the at least one external memory being respectively associated with each of the at least one aircraft;
a processing unit configured to process the histories of the primary data stored in the at least one external memory, the processing unit generating valorized data; and
a fourth communication interface configured to emit the valorized data and the history of the primary data contained in the at least one external memory.

According to the disclosure, such an architecture is remarkable in that the mobile electronic device includes:
a fifth communication interface configured to receive the valorized data and the history of the primary data;
an internal memory configured to store the valorized data;
an analysis unit; and
an alerter configured to display at least one item of monitoring information; and in that the analysis unit and the alerter are configured to implement the following modes:
in a local operating mode, the analysis unit is configured to analyze the valorized data contained in the internal memory and generate an item of health information relating to the one or more aircraft, the health information consisting either of a take-off authorization for the one or more aircraft or a take-off prohibition for the one or more aircraft, the at least one item of monitoring information being the health information; and in a connected operating mode of the mobile electronic device during which the mobile electronic device is connected to the cloud computing infrastructure, the analysis unit is configured to analyze the valorized data contained in the internal memory and the history of the primary data stored in the at least one external memory and to generate an item of predictive maintenance information for the one or more aircraft, the monitoring information being the predictive maintenance information.

In other words, such a mobile electronic device may be used according to two operating modes that are different from each other, as chosen by an operator via the use of a human-machine interface.

In the local operating mode, the mobile electronic device is therefore not connected to the cloud computing infrastructure. However, in this case, the analysis unit of the mobile electronic device can analyze the valorized data previously stored in the internal memory of the mobile electronic device. In this local operating mode, the analysis unit can also, using this valorized data, generate or calculate other valorized data and store it in the internal memory. The internal memory therefore makes it possible, in the local operating mode, to store valorized data previously generated by the processing unit of the cloud computing infrastructure or indeed by the analysis unit.

Such an analysis unit may in particular comprise at least one processor and at least one memory, at least one integrated circuit, at least one programmable system, at least one logic circuit, these examples not limiting the scope given to the expression "analysis unit". The term "processor" may refer equally to a central processing unit (CPU), a graphics processing unit (GPU), a digital signal processor (DSP), a microcontroller, etc.

Similarly, such a processing unit may in particular comprise at least one processor and at least one memory, at least one integrated circuit, at least one programmable system, at least one logic circuit, these examples not limiting the scope given to the expression "processing unit".

The sensors for generating avionics data may include, for example:
one or more accelerometers;
one or more tachometers;
one or more vehicle acquisition systems;
one or more speed sensors;
one or more oil pressure sensors;
one or more temperature sensors;
one or more landing gear and/or skid contact sensors of the aircraft;
one or more satellite positioning receivers of the aircraft;
one or more attitude sensors of the aircraft;
one or more barometric altitude sensors of the aircraft; and
one or more radio altimeter providing a height of the aircraft relative to the overflown ground.

In addition, the primary data may include, in addition to the avionics data, operational data such as, for example:
one or more data produced on board such as counters, cycles, alarms and alerts;
one or more avionics system fault codes provided by the avionics system;
one or more speeds of rotation related to the dynamic assemblies and engines of the aircraft, such as a speed of an engine output shaft, a speed of rotation of a rotor;
one or more torque and load data;
one or more environmental and contextual data; and
one or more vibrational data generated from measurements from one or more accelerometers.

The valorized data are produced on the ground either in the cloud computing infrastructure or in the mobile electronic device and, therefore, outside the avionics system on board the aircraft.

Consequently, both in the local operating mode and in the connected operating mode, the calculations or methods for generating and analyzing the valorized data can be updated very simply without requiring the architecture to be re-certified.

In the connected operating mode, connecting the mobile electronic device to the cloud computing infrastructure can therefore make it possible to update the analysis methods that then generate the health information in the local operating mode or the predictive maintenance information in the connected operating mode.

Such valorized data may include, for example:
one or more diagnostic data;
one or more alarms calculated on the ground;
one or more anticipated alarms; and
one or more recommendations for authorized personnel, such as:
maintenance operators;

professionals responsible for managing the airworthiness of the aircraft;

Health and Usage Monitoring System (HUMS) managers; and personnel in charge of operations, etc.

The term "cloud computing infrastructure" refers to a decentralized and highly available infrastructure also known as "cloud computing". Such an infrastructure is said to be decentralized because it provides a networked storage model in which avionics data and operational data can be stored on multiple machines. This cloud computing infrastructure can also be described as "proprietary" insofar as it is administered by the manufacturer of the one or more aircraft. The customer or the user of the one or more aircraft is therefore not authorized to know the operation or the organization of the infrastructure. Similarly, access to the content of the various external memories and therefore to the primary data is administered by the owner of the cloud computing infrastructure.

Furthermore, in the connected operating mode of the mobile electronic device, the analysis unit of the mobile electronic device can analyze the valorized data previously stored in the internal memory of the mobile electronic device and also the history of the primary data contained in the external memory.

The second and fifth communication interfaces may possibly be merged with each other and be formed, for example, by a network card capable of communicating according to a wireless communication protocol with the third and fourth communication interfaces respectively. Such a wireless communication protocol may in particular be a mobile phone protocol such as, for example, a GSM (Global System for Mobile Communications) protocol or a Wi-Fi protocol.

Such an architecture is also simple to use and can enable the same operator to carry out both health diagnostics for a particular aircraft and predictive maintenance diagnostics for that same aircraft.

Advantageously, the storage unit of the avionics system can be removable relative to one or more aircraft.

In other words, once the aircraft has landed, the storage unit may be detached and removed from the aircraft in order to allow the avionics data to be transferred to the first communication interface of the mobile electronic device.

According to one particular embodiment, the storage unit may be formed by a memory card, the first interface including a memory card reader compatible with the memory card.

Thus, once an aircraft has landed, an operator can extract the memory card from the aircraft and insert it into a card reader of the mobile electronic device. The avionics data may then be transferred by the mobile electronic device to the cloud computing infrastructure.

In practice, the avionics system of each aircraft may include a sixth communication interface configured to emit the avionics data, the first interface including an antenna configured to receive, according to a wireless communication protocol, the avionics data emitted by the sixth interface.

In other words, in parallel with the use of a memory card for transmitting the avionics data to the mobile electronic device, a connection using a wireless communication protocol can also be used. The sixth interface may then include a first network card for communicating with the electronic device. Such a communication protocol may in particular be a Wi-Fi or Bluetooth protocol.

Advantageously, the architecture may include at least one ground station including a seventh communication interface configured to receive the primary data emitted by the second interface.

Therefore, in addition to the cloud computing infrastructure, the ground station or stations may also be used to collect the primary data emitted by the second interface.

According to one particular embodiment, the ground station or stations may include an eighth communication interface configured to emit the primary data, the third interface being configured to receive the primary data emitted by the eighth interface.

In this scenario, the ground station or stations may act as an intermediary for the transmission of the primary data between the mobile electronic device and the cloud computing infrastructure.

In practice, the seventh interface may comprise a ground antenna configured to receive, according to a wireless communication protocol, the primary data emitted by the second interface.

Furthermore, the seventh and eighth communication interfaces may also be merged with each other and be formed, for example, by a network card capable of communicating according to a wireless communication protocol with the second and third communication interfaces respectively. Such a wireless communication protocol may in particular be a mobile phone protocol such as, for example, a GSM (Global System for Mobile Communications) protocol or a Wi-Fi protocol.

Advantageously, the third interface may comprise at least one external antenna configured to receive, according to a wireless communication protocol, the avionics data emitted by the sixth interface.

In other words, in this scenario, the avionics data can be transmitted directly via a wireless communication protocol from the aircraft to the cloud computing infrastructure. The sixth interface may then include a second network card for communicating with the cloud computing infrastructure. Such a communication protocol may in particular be a mobile phone protocol such as, for example, a GSM (Global System for Mobile Communications) protocol, a GPRS (General Packet Radio Service) protocol, a UMTS (Universal Mobile Telecommunications System) protocol, etc.

In practice, the mobile electronic device may include an input means configured to allow an operator to input at least one maintenance operation, the analysis unit being configured to convert the at least one maintenance operation into operational data.

Thus, the primary data transmitted to the cloud computing infrastructure may also comprise this operational data generated by the analysis unit of the mobile electronic device.

The object of the present disclosure is also a method for monitoring at least one aircraft, the method comprising the following steps:

generation of avionics data during use of the one or more aircraft;

recording of the avionics data in a storage unit on board the one or more aircraft;

transmission of primary data comprising at least the avionics data contained in the storage unit to a mobile electronic device;

transmission of the primary data to a cloud computing infrastructure;

recording of a history of the primary data of the at least one aircraft in at least one external memory of the cloud computing infrastructure, each of the at least one external memory being respectively associated with each of the at least one aircraft;

processing of the history of the primary data in order to generate valorized data; and transmission of the valorized data from the cloud computing infrastructure to the mobile electronic device.

According to the disclosure, such a method is remarkable in that it comprises the following steps:

storing of the valorized data in an internal memory of the mobile electronic device;

in a local operating mode of the mobile electronic device, local analysis of the valorized data contained in the internal memory and local generation of an item of health information relating to the one or more aircraft, the health information consisting either of a take-off authorization for the one or more aircraft or a take-off prohibition for the one or more aircraft;

in a connected operating mode of the mobile electronic device during which the mobile electronic device is connected to the cloud computing infrastructure, transmission of the history of the primary data contained in the at least one external memory to the mobile electronic device, connected analysis of the valorized data contained in the internal memory and the history of the primary data stored in said at least one external memory, and connected generation of an item of predictive maintenance information for the one or more aircraft; and displaying of at least one item of monitoring information to an operator, wherein, in the local operating mode, the at least one item of monitoring information is the health information and, in the connected operating mode, the at least one item of monitoring information is the predictive maintenance information.

Consequently, such a mobile electronic device can be used by an operator in the local operating mode and in the connected operating mode, as required.

Moreover, in the connected operating mode, the predictive maintenance information may be displayed in order to indicate a deadline for a maintenance intervention for replacing a fluid, such as an oil or a coolant, or indeed an aircraft component that has reached an operating hours threshold.

The operator can thus plan a maintenance operation on the aircraft depending on a future use of the aircraft, or can prohibit the flight. Such a monitoring method thus makes it possible to schedule maintenance operations when the aircraft is not in use and/or minimize the immobilization of the aircraft.

Furthermore, such a monitoring method is also advantageous because it makes it possible to adapt the predictive maintenance information depending on the history of the primary data and therefore an actual use of the aircraft and/or the flight conditions, which may have a not-insignificant impact on the frequency of the maintenance operations to be carried out.

The processing step for generating valorized data may comprise, for example, the following sub-steps:

reading of the primary data stored in the on-board storage unit, for example a memory card;

decoding of the primary data for use by valorization software; and production of the valorized data using the valorization software comprising one or more valorization algorithms.

Furthermore, the monitoring method according to the disclosure may comprise a step in which an operator inputs at least one maintenance operation on the mobile electronic device, the maintenance operation or operations being converted into operational data. In addition, the primary data may include, in addition to the avionics data, this operational data.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

As mentioned above, the disclosure relates to a monitoring architecture that makes it possible, in particular, to carry out maintenance operations on at least one aircraft. This architecture also makes it possible to process maintenance data related to maintenance operations on one or more aircraft manufactured by the same aircraft manufacturer. Such aircraft having the same monitoring architecture may then belong to the same client or to several different clients.

Figure 1:
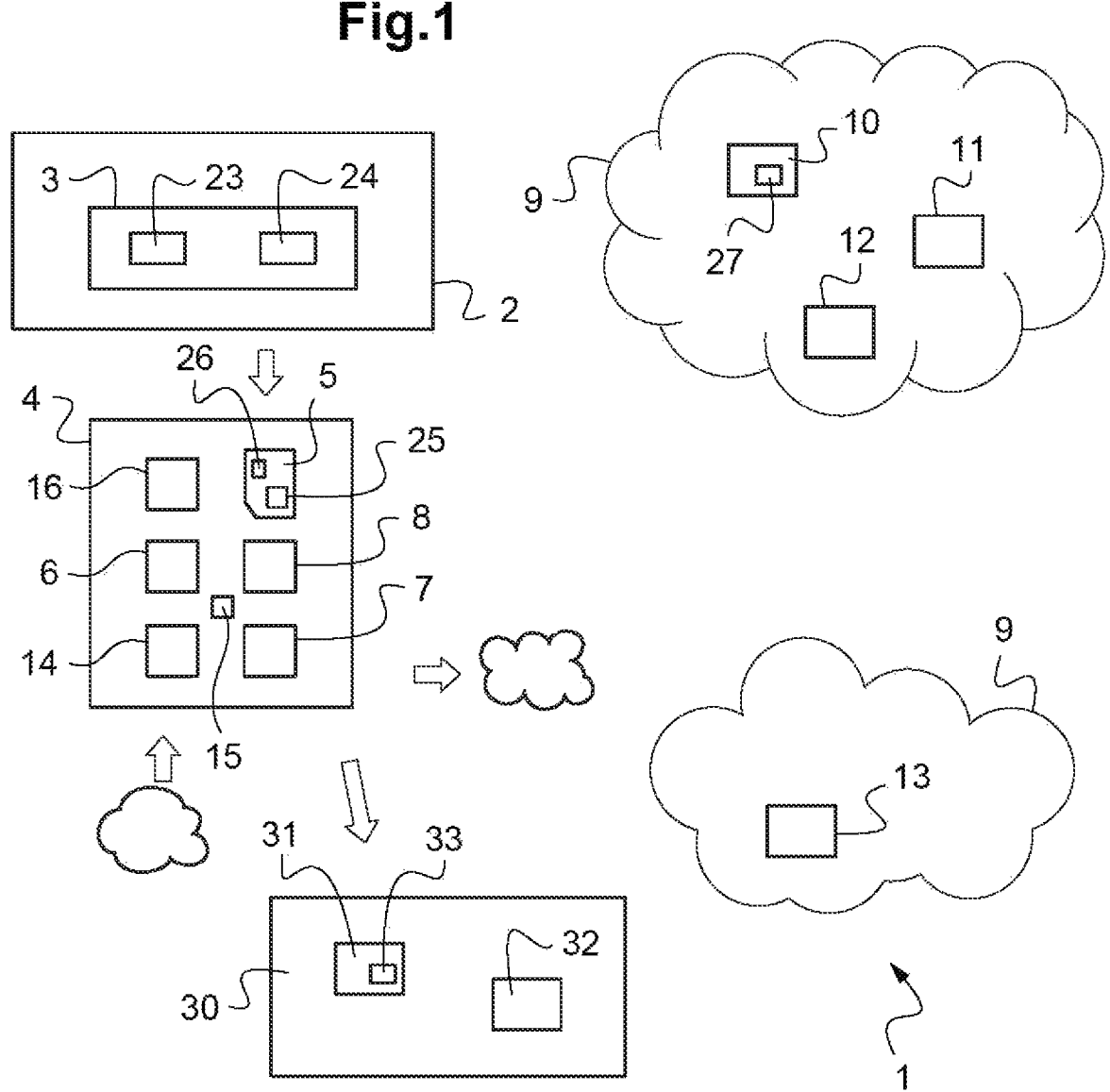
FIG. 1 is a diagram showing a monitoring architecture according to the disclosure.

As shown in FIG. 1, such an architecture 1 comprises at least one aircraft 2 provided with an avionics system 3. Several aircraft 2 can therefore be part of this architecture 1, and each aircraft 2 then comprises its own avionics system 3.

Each avionics system 3 makes it possible to generate avionics data during use of an aircraft 2. These avionics data can then be recorded during a flight phase of the aircraft 2 in a storage unit 23 of the avionics system 3. Such a storage unit 23 is therefore carried on board the aircraft 2.

Furthermore, such an architecture 1 also includes a mobile electronic device 4 for one or more aircraft 2 that is provided with a first communication interface 5 allowing primary data to be received comprising at least the avionics data contained in the storage unit 23 and possibly operational data also generated in flight.

Moreover, the mobile electronic device 4 may include an input means 6 configured to allow an operator to input at least one maintenance operation, this or these maintenance operations being converted by an analysis unit into other operational data.

The mobile electronic device 4 then includes a second communication interface 7 configured to emit the primary data including the avionics data, and also operational data.

Such a storage unit 23 may advantageously be removable relative to the aircraft 2 and the avionics system 3. The storage unit 23 may then comprise, for example, a memory card, an integrated memory stick, or a removable hard disk. In this case, the first communication interface 5 configured to receive the avionics data may be provided with a memory card reader 25 thus making it possible to read the avionics data contained in the storage unit 23.

In parallel with the use of a removable storage unit and a memory card reader 25, each avionics system 3 may optionally include a sixth communication interface 24 for emitting the primary data. In this case, the first interface 5 may include at least one antenna 26 allowing the primary data emitted by the sixth interface 24 to be received according to a wireless communication protocol.

Furthermore, such an architecture 1 also includes a cloud computing infrastructure 9 that includes a third communication interface 10 configured to receive the primary data emitted by the second interface 7.

This cloud computing infrastructure 9 is also provided, for each of the aircraft 2, with an external memory 11 specific to a particular aircraft 2. This external memory 11 also makes it possible to store a history of the primary data of this aircraft 2.

Such a cloud computing infrastructure 9 then has a processing unit 12 making it possible to process the histories of the primary data of each aircraft 2. This processing unit 12 thus makes it possible to generate valorized data from the primary data stored in the external memory 11.

Such a processing unit 12 may, for example, comprise at least one processor and at least one memory, at least one integrated circuit, at least one programmable system, at least one logic circuit, these examples not limiting the scope given to the expression "processing unit". The term "processor" may refer equally to a central processing unit (CPU), a graphics processing unit (GPU), a digital signal processor (DSP), a microcontroller, etc.

Finally, the cloud computing infrastructure 9 comprises a fourth communication interface 13 making it possible to emit the valorized data and the history of the primary data contained in the external memory 11 to the mobile electronic device 4.

Consequently, in order to be able to receive these valorized data and the history of the primary data, the mobile electronic device 4 comprises a fifth communication interface 14.

The mobile electronic device 4 also comprises an internal memory 8 for storing the valorized data generated by the processing unit 12 of the cloud computing infrastructure 9.

Furthermore, the mobile electronic device 4 is also provided with an analysis unit 15 capable of analyzing the valorized data and, optionally, the history of the primary data. Finally, the mobile electronic device 4 comprises an alerter 16 making it possible to display at least one item of monitoring information and thus to transmit at least one sensory signal to an operator, for example a visual, audible or vibratory signal. Such an alerter 16 may advantageously comprise a screen.

Moreover, the analysis unit 15 may comprise, for example, at least one processor and at least one memory, at least one integrated circuit, at least one programmable system, at least one logic circuit, these examples not limiting the scope given to the expression "analysis unit". The term "processor" may refer equally to a central processing unit (CPU), a graphics processing unit (GPU), a digital signal processor (DSP), a microcontroller, etc.

In addition, the analysis unit 15 and the alerter 16 are configured to implement at least two operating modes that are different from one another, namely a local operating mode in which the mobile electronic device 4 is disconnected from the cloud computing infrastructure 9 and a connected operating mode of the mobile electronic device 4.

In the local operating mode of the mobile electronic device 4, the analysis unit 15 analyzes the valorized data contained in the internal memory 8 and generates an item of health information relating to the aircraft 2 in question with which it is associated. Such an analysis unit 15 thus contributes to the safety of the aircraft 2. Indeed, such an item of health information thus consists either of a take-off authorization for this aircraft 2 or a take-off prohibition for the aircraft 2. The health information then constitutes the monitoring information displayed by the alerter 16. In other words, when this health information is transmitted to the operator, the latter may not be authorized to have the aircraft 2 take off.

The operator may then seek to understand the cause of this take-off prohibition by setting the mobile electronic device 4 in the connected operating mode of the mobile electronic device 4.

Furthermore, in the connected operating mode of the mobile electronic device 4, the mobile electronic device 4 is connected to the cloud computing infrastructure 9. In this mode, the analysis unit 15 is configured to analyze the valorized data contained in the internal memory 8 and the history of the primary data stored in the external memory 11. The analysis unit 15 then generates an item of predictive maintenance information for this aircraft 2. The predictive maintenance information then constitutes the monitoring information displayed by the alerter 16. Thus, such predictive maintenance information is then displayed on the alerter 16 in order to be signalled to the operator.

In addition to an item of predictive maintenance information, the operator may possibly then also be informed of a failure or of an urgent maintenance operation to be carried out on the aircraft 2, prohibiting it from taking off.

Parallel to the use of the mobile electronic device 4, the architecture 1 may also include one or more ground stations each including a seventh communication interface 31. This seventh interface 31 thus makes it possible to receive the primary data emitted by the second interface 7 of the mobile electronic device 4.

Such a seventh interface 31 may comprise at least one ground antenna 33 allowing the primary data emitted by the second interface 7 to be received, according to a wireless communication protocol.

In addition, each ground station 30 may advantageously include an eighth communication interface 32 configured to emit the primary data and transmit it to the cloud computing infrastructure 9. In this case, the third interface 10 of the cloud computing infrastructure 9 may also make it possible to receive the primary data emitted by the eighth interface 32.

Furthermore, this third interface 10 of the cloud computing infrastructure 9 may, for example, comprise at least one external antenna 27 configured to receive, according to a wireless communication protocol, the avionics data emitted directly by the avionics system 3 by means of the sixth interface 24.

Figure 2:
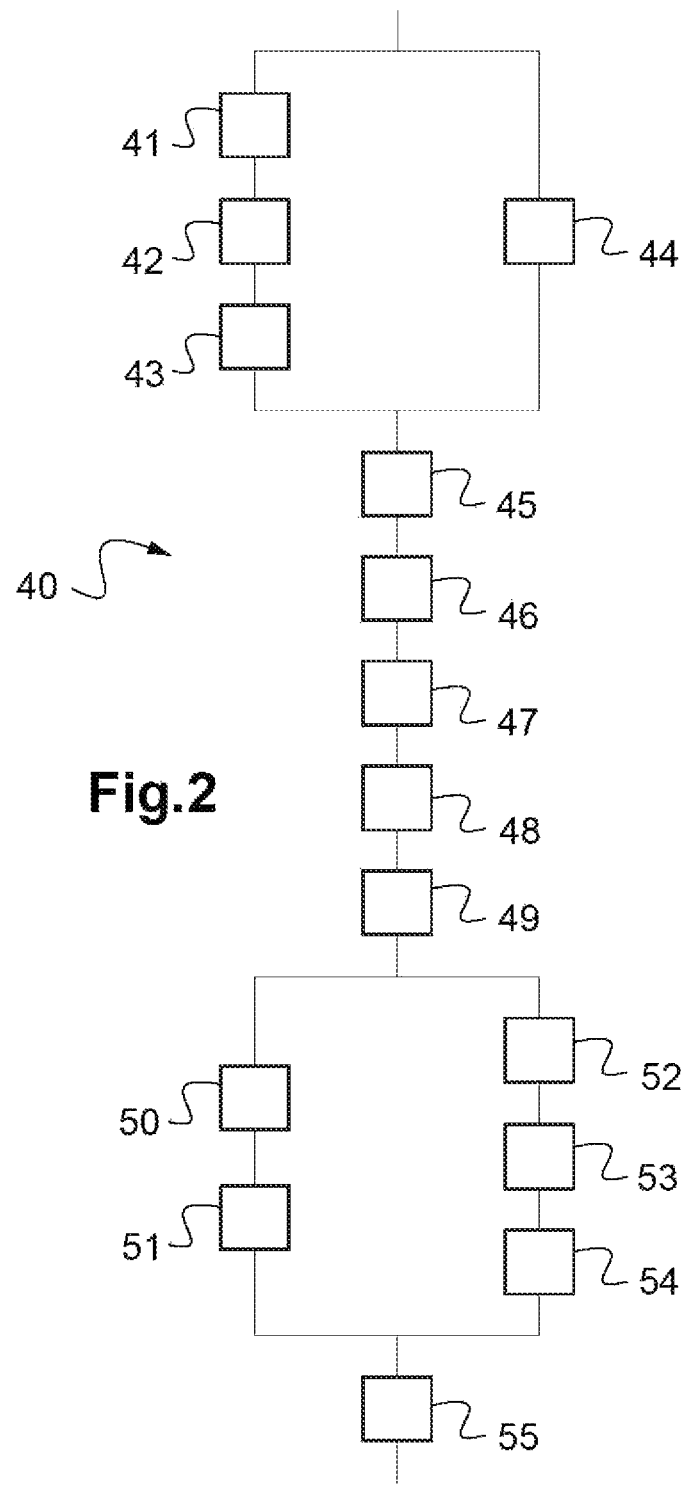
FIG. 2 is a logic diagram showing a method for monitoring at least one aircraft, according to the disclosure.

As shown in FIG. 2, the disclosure also relates to a method 40 for monitoring at least one aircraft 2.

Such a method 40 thus makes it possible at least to process maintenance data related to the maintenance operations of each aircraft 2. Such a method 40 comprises the following steps:

generation 41 of avionics data during use of at least one aircraft 2;

recording 42 of the avionics data in a storage unit 23 on board each aircraft 2;

transmission 43 of primary data comprising at least the avionics data contained in the storage unit 23 to a mobile electronic device 4, such as a smartphone, a tablet computer, a laptop computer or the like;

transmission 45 of the primary data to a cloud computing infrastructure 9;

for each aircraft 2, recording 46 of a history of the primary data in an external memory 11 of the cloud computing infrastructure 9;

processing 47 of the history of the primary data in order to generate valorized data;

transmission 48 of the valorized data from the cloud computing infrastructure 9 to the mobile electronic device 4;

storing 49 of the valorized data in an internal memory 8 of the mobile electronic device 4;

in a local operating mode of the mobile electronic device 4, local analysis 50 of the valorized data contained in the internal memory 8 and local generation 51 of an item of health information relating to the aircraft 2, the health information consisting either of a take-off authorization for the aircraft 2 or a take-off prohibition for the aircraft 2; and in a connected operating mode of the mobile electronic device 4 during which the mobile electronic device 4 is connected to the cloud computing infrastructure 9, transmission 52 of the history of the primary data contained in the external memory 11 to the mobile electronic device 4, connected analysis 53 of the valorized data contained in the internal memory 8 and the history of the primary data stored in the external memory 11, and connected generation 54 of an item of predictive maintenance information for the aircraft 2.

The method 40 may include an optional step in which an operator inputs 44 at least one maintenance operation on the mobile electronic device 4, this at least one maintenance operation being converted into operational data.

Moreover, the processing step 47 may comprise, for example, the following sub-steps:

reading of the primary data stored in the on-board storage unit, for example a memory card;

decoding of the primary data for use by valorization software; and production of the valorized data using the valorization software comprising one or more valorization algorithms.

Finally, the method 40 comprises a displaying step 55 making it possible to transmit at least one item of monitoring information chosen from the group comprising the health information and the predictive maintenance information item to an operator. More specifically, in the local operating mode, the one or more items of information transmitted to the operator are the one or more items of health information, while in the connected operating mode, the one or more items of information transmitted to the operator are the one or more items of predictive maintenance information.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. An architecture for monitoring at least one aircraft, the architecture including:
    an avionics system provided on the at least one aircraft, the avionics system being configured to generate avionics data during use of the at least one aircraft, the avionics system comprising a storage unit configured to store the avionics data;
    a mobile electronic device including:
        a first communication interface configured to receive primary data including at least the avionics data; and
        a second communication interface configured to emit the primary data; and
    a cloud computing infrastructure including:
        a third communication interface configured to receive the primary data emitted by the second interface;
        at least one external memory storing a history of the primary data of the at least one aircraft, each of the at least one external memory being respectively associated with each of the at least one aircraft;
        a processing unit configured to process the histories of the primary data stored in the at least one external memory, the processing unit generating valorized data; and
        a fourth communication interface configured to emit the valorized data and the history of the primary data contained in the at least one external memory,
    wherein the mobile electronic device includes:
        a fifth communication interface configured to receive the valorized data and the history of the primary data;
        an internal memory configured to store the valorized data;
        an analysis unit; and
        an alerter configured to display at least one item of monitoring information;
    wherein the analysis unit and the alerter are configured to implement the following modes:
    in a local operating mode, the analysis unit is configured to analyze the valorized data contained in the internal memory and generate an item of health information relating to the at least one aircraft, the health information consisting either of a take-off authorization for the at least one aircraft or a take-off prohibition for the at least one aircraft, the at least one item of monitoring information being the health information; and
    in a connected operating mode of the mobile electronic device during which the mobile electronic device is connected to the cloud computing infrastructure, the analysis unit is configured to analyze the valorized data contained in the internal memory and the history of the primary data stored in the at least one external memory and to generate an item of predictive maintenance information for the aircraft, the at least one item of monitoring information being the predictive maintenance information.

2. The monitoring architecture according to claim 1 wherein the storage unit of the avionics system is removable relative to the at least one aircraft.

3. The monitoring architecture according to claim 2 wherein the storage unit is formed by a memory card, the first interface comprising a memory card reader compatible with the memory card.

4. The monitoring architecture according to claim 1 wherein the avionics system includes a sixth communication interface configured to emit the avionics data, the first interface including an antenna configured to receive, according to a wireless communication protocol, the avionics data emitted by the sixth interface.

5. The monitoring architecture according to claim 1 wherein the architecture includes at least one ground station including a seventh communication interface configured to receive the primary data emitted by the second interface.

6. The monitoring architecture according to claim 5 wherein the at least one ground station includes an eighth communication interface configured to emit the primary data, the third interface being configured to receive the primary data emitted by the eighth interface.

7. The monitoring architecture according to claim 1 wherein the seventh interface comprises a ground antenna configured to receive, according to a wireless communication protocol, the primary data emitted by the second interface.

8. The monitoring architecture according to claim 1 wherein the third interface comprises at least one external antenna configured to receive, according to a wireless communication protocol, the avionics data emitted by the sixth interface.

9. The monitoring architecture according to claim 1 wherein the mobile electronic device includes an input means configured to allow an operator to input at least one maintenance operation, the analysis unit being configured to convert the at least one maintenance operation into operational data.

10. A method for monitoring at least one aircraft, the method comprising the following steps:
- generation of avionics data during use of the at least one aircraft;
- recording of the avionics data in a storage unit on board the at least one aircraft;
- transmission of primary data comprising at least the avionics data contained in the storage unit to a mobile electronic device;
- transmission of the primary data to a cloud computing infrastructure;
- recording of a history of the primary data of the at least one aircraft in at least one external memory of the cloud computing infrastructure, each of the at least one external memory being respectively associated with each of the at least one aircraft;
- processing of the history of the primary data in order to generate valorized data; and
- transmission of the valorized data from the cloud computing infrastructure to the mobile electronic device;

wherein the method comprises the following steps:
- storing of the valorized data in an internal memory of the mobile electronic device;
- in a local operating mode of the mobile electronic device, local analysis of the valorized data contained in the internal memory and local generation of an item of health information relating to the at least one aircraft, the health information consisting either of a take-off authorization for the at least one aircraft or a take-off prohibition for the at least one aircraft;
- in a connected operating mode of the mobile electronic device during which the mobile electronic device is connected to the cloud computing infrastructure, transmission of the history of the primary data contained in the at least one external memory to the mobile electronic device, connected analysis of the valorized data contained in the internal memory and the history of the primary data stored in the at least one external memory, and connected generation of an item of predictive maintenance information for the at least one aircraft; and
- displaying of at least one item of monitoring information to an operator, wherein, in the local operating mode, the at least one item of monitoring information is the health information and, in the connected operating mode, the at least one item of monitoring information is the predictive maintenance information.

11. The method for monitoring at least one aircraft according to claim 10 wherein the method includes a step in which an operator inputs at least one maintenance operation on the mobile electronic device, this at least one maintenance operation being converted into operational data.

12. The method for monitoring at least one aircraft according to claim 10 wherein the processing step includes the following sub-steps:
- reading of the primary data stored in the storage unit;
- decoding of the primary data for use by valorization software; and
- production of the valorized data using the valorization software comprising one or more valorization algorithms.

* * * * *